United States Patent Office 3,544,679
Patented Dec. 1, 1970

3,544,679
PARAFFINIC BASE OIL CARRIER COMPOSITIONS FOR USE IN METAL WORKING AND PESTICIDES
Frederic C. McCoy, % Texaco Inc., P.O. Box 509, Beacon, N.Y. 12508
No Drawing. Filed June 24, 1968, Ser. No. 739,182
Int. Cl. C10m 1/46, 1/32
U.S. Cl. 424—80
13 Claims

ABSTRACT OF THE DISCLOSURE

A base oil composition comprising (1) a paraffinic hydrocarbon oil having an unsulfonatable content of at least about 90 wt. percent, (2) an oil soluble aluminum, iron, nickel, alkali metal, alkaline earth metal or alkyl ammonium salt of a carboxylic acid or dihydrocarbyl orthophosphoric acid and (3) an oil soluble ashless dispersant for lubricating oils selected from (a) an alkylene oxide derivative of an organic phosphorus acid, (b) an alkyl methacrylate-vinyl pyrrolidinone copolymer or (c) an alkoxylated piperazine derivative of alkenyl succinic anhydride.

BACKGROUND OF INVENTION

Field of invention

This invention relates to the area of art pertaining to hydrocarbon oil compositions containing a metal or alkyl ammonium salt of an organic acid and ashless lube oil dispersant wherein said compositions are useful agricultural and metal working fields.

Description of prior art

In storage of many of the mineral oil compositions employed in metal working sedimentation often occurs. This undesirable sedimentation is in large measure the result of precipitation of the inorganic compounds normally used therein. Much effort has been expended with varying degrees of success to devise easily appliable formulations in which sedimentation is either prevented or substantially reduced.

In agricultural areas many of the base oil compositions used as mediums to disperse solid pesticidal materials are deficient in that they were either too viscous at ambient temperature and required inordinately high pressures for distribution or, although of satisfactory viscosity, did not prevent the undesirable formation of a dense sediment of solid pesticide upon storage or upon transport.

SUMMARY OF INVENTION

I have discovered and this constitutes my invention a paraffinic hydrocarbon oil composition of superior dispersant and fluidity properties under quiescent and agitated conditions in agricultural and metal working use which is sufficiently fluid to be readily susceptible to spraying agricultural areas and produce easily applicable metal forming compositions and yet maintain solid particles present or formed therein in a suspended state under long periods of quiescent conditions resulting from storage, transport or non-use. More particularly, this invention relates to a composition comprising (1) a paraffinic oil of an unsulfonatable content of at least about 90% containing (2) an oil soluble aluminum, nickel, iron, alkali metal, alkaline earth metal, or alkyl ammonium salt of alkanoic acid, dialkyl orthophosphoric acid or alkylalkenyl orthophosphoric acid and (3) an ashless lubricating oil dispersant selected from (a) an alkylene oxide derivative of an organic phosphorus acid, (b) alkyl methacrylate N-vinyl-2-pyrrolidinone copolymer or (c) an alkoxylated piperazine derivative of alkenyl succinic anhydride.

DETAILED DESCRIPTION OF THE INVENTION

Specifically, the base oil composition contemplated herein comprises a paraffinic hydrocarbon oil of a kinematic viscosity between about 1.5 and 70 centistokes (cs.) at 100° F. and an unsulfonatable content of at least about 90 wt. percent containing between about 0.1 and 2 wt. percent of an oil soluble sediment resisting salt of the formula $M(Z)_y$ where M is a first member selected from the group consisting of an ion of aluminum, nickel, iron, alkali metal, alkaline earth metal, and alkylammonium of from 3 to 20 carbons, y is an integer representing the valence of said first member, Z is a monovalent radical selected from the group consisting of the formula:

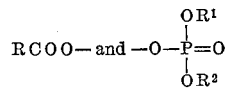

where R is alkyl of from 5 to 12 carbons, $R^1$ is alkyl of from 1 to 3 carbons and $R^2$ is a second member selected from the group consisting of alkyl and alkenyl of from 10 to 22 carbons, said oil composition further containing between about 0.1 and 5 wt. percent of an oil soluble, ashless dispersant selected from the group consisting of:

(a) An alkoxylated derivative of an inorganic phosphorus acid free, steam hydrolyzed polyalkene (250–50,000 M.W.)-$P_2S_5$ reaction product where the alkoxy group contains from 2 to 10 carbons;

(b) A copolymer of N-vinyl-2-pyrrolidinone and alkyl methacrylate of a molecular weight between about 100,000 and 2,000,000 consisting of between about 4 and 15 wt. percent N-vinyl-2-pyrrolidinone and between about 85 and 96 wt. percent of alkyl methacrylate, said alkyl containing from 4 to 18 carbons;

(c) And a condensation product of trialkoxylated N-aminoalkyl piperazine and alkenyl succinic anhydride of a molecular weight between about 2000 and 5000 wherein said alkoxy is of from 2 to 10 carbons, said alkyl is from 1 to 5 carbons, and said alkenyl is of from 50 to 200 carbons derived from an alkene of from 2 to 10 carbons.

Under preferred circumstances, the paraffinic oil has a kinematic viscosity of between 4 and 30 cs. at 100° F., a sediment resistant salt content between 0.4 and 0.6 wt. percent and an ashless lubricating oil dispersant content of between about 0.3 and 1.6 wt. percent.

The composition is prepared by introducing the salt and dispersant into the paraffinic base oil, preferably under conditions of agitation, e.g., stirring and elevated temperature, e.g., between about 220 and 300° F. until the salt and dispersant are dissolved therein. When the paraffinic oil is composed of fractions of different viscosities, the oil soluble salt and ashless dispersant are desirably blended into the fraction of the lowest viscosity and then the resultant mixture in turn is blended with the higher viscosity fraction or fractions.

In another method of compounding the composition, a concentrate of the salt and the dispersant in proper proportions is prepared in one of the base oils, by heating and stirring, as is hereinafter described. This concentrate can then be diluted with the desired base oil to give the finished composition.

As heretofore stated, the oil component of the composition is essentially a paraffinic hydrocarbon oil having less than about 10 wt. percent, preferably less than about 5 wt. percent, of an aromatic naphthenic and/or aliphatic unsaturated content, that is, less than 10 wt. percent and preferably less than 5 wt. percent sulfonatable residue. When utilizing the base oil composition for application as an agricultural pesticide composition, it is most preferred to employ paraffinic oil components having a boiling range of between about 320 and 870° F. and a kinematic viscosity of between about 4.0 and 16 cs. at 100° F.

Specific representative examples of suitable paraffinic mineral oil fractions contemplated herein are as follows:

(1) A refined fraction from a paraffinic base crude oil having a flash point of 270° F., a kinematic viscosity of 4.5 cs. at 100° F., a boiling range of 508 to 650° F. and an unsulfonatable content of 95 wt. percent.

(2) A blend of a wax distillate fraction from a refined paraffinic base crude, together with a residuum fraction from a paraffinic base crude, the blend having a flash point of 355° F., a kinematic viscosity at 100° F. of 17.5 cs., a boiling range of 617 to 853° F. and an unsulfonatable content of 90 wt. percent.

(3) A blend similar to the previous oil having a flash point of 355° F., a kinematic viscosity at 100° F. of 15 cs., a boiling range of 630 to 752° F. and an unsulfonatable residue of 96 wt. percent.

(4) Paraffinic alkylate bottoms removed as residues in the manufacture of aviatiton gasoline via the reaction of isobutane and butylene in a sulfuric acid catalyst system having an initial boiling point of 318° F., an end boiling point of 512° F., a 50% boiling point of 362° F., a kinematic viscosity at 100° F. of 1.6 cs., and an unsulfonatable content of 95 wt. percent.

The employment of an oil having an unsulfonatable content of at least about 90 wt. percent is material in that when the sulfonatable content substantially exceeds about 10 wt. percent the viscosity of compositions of the invention employed often rapidly and undesirably increase when inorganic compounds or agricultural pesticides are incorporated therein. A ready explanation of why this occurs is not apparent. Furthermore, for agricultural uses, an unsulfonatable content of at least about 90 wt. percent is desirable to avoid damage to plants.

Examples of the sediment resistant salts contemplated herein are: aluminum trihexanoate, aluminum trioctanoate, aluminum tridodecanoate, aluminum tri-(ethyloleyl-o-phosphate), aluminum tri-(ethyllauryl-o-phosphate), ferric octanoate, ferric tri-(methylpentadecyl-o-phosphate), nickel dinonoate, nickel di-(propyltridecenyl-o-phosphate) calcium diheptanoate, calcium di-(propyltetradecenyl-o-phosphate) n-butylammonium octanoate, n-butylammonium ethyloleyl-o-phosphate and a mixture of t-$C_{12}H_{25}NH_3^+$, t-$C_{13}H_{27}NH_3^+$, t-$C_{14}H_{29}NH_3^+$ and t-$C_{15}H_{31}NH_3^+$ ethyloleyl-o-phosphates, wherein t stands for tertiary.

Hereinbefore and hereinafter the term "ashless dispersant" is intended to denote organic dispersants which contain essentially no metal. Subsequent hereto are listed specific examples in the three classes of ashless dispersants contemplated herein.

Specific examples of the alkoxylated organic phosphorus acid free, steam-hydrolyzed polyalkene(250–50,000 M.W.)-phosphorus pentasulfide reaction products are the ethylene oxide derivative of inorganic phosphorus acid free, steam hydrolyzed polybutene(1100 M.W.)-$P_2S_5$ reaction product in which the ethylene oxide and reaction product components are present in a mole ratio of about 1:1; the butylene oxide derivative of inorganic phosphorus acid free, steam hydrolyzed polypropylene (6000 M.W.)-$P_2S_5$ reaction product in which the 2,3-butylene oxide component and reaction product is present in said derivative in a mole ratio of about 1:1 and a 4-methyl-2,3-octylene oxide derivative of inorganic phosphorus acid free, steam hydrolyzed polyethylene (30,000 M.W.)-$P_2S_5$ reaction product where the mole ratio of said oxide to said product in said derivative is about 1:1. The polyolefin forming the reaction product is normally a polyalkene of from 2 to 10 carbons where the alkylene oxide employed to form the derivative advantageously has between 2 and 10 carbons. The derivatives contemplated herein are further described in U.S. 3,087,956.

Specific examples of the copolymer of N-vinyl-2-pyrrolidinone and alkyl methacrylate in the molecular weight range of 100,000 to 2,000,000 are copolymers comprising 6 to 10 wt. percent N-vinyl-2-pyrrolidinone, 25 to 35 wt. percent stearyl methacrylate, 15 to 55 wt. percent lauryl methacrylate and 10 to 14 wt. percent butyl methacrylate. A particularly preferred copolymer comprises about 8 wt. percent N-vinyl-2-pyrrolidinone, 30 wt. percent stearyl methacrylate, 50 wt. percent lauryl methacrylate and 12 wt. percent butyl methacrylate of about 550,000 molecular weight (M.W.). Other examples are a copolymer comprising about 12 wt. percent N-vinyl-2-pyrrolidinone and 88 wt. percent dodecyl methacrylate of a molecular weight of about 300,000; a copolymer of about 10 wt. percent N-vinyl-2-pyrrolidinone, 10 wt. percent octyl methacrylate and 80 wt. percent octadecyl methacrylate of a molecular weight of about 1,800,000; and a copolymer comprising about 4 wt. percent N-vinyl-2-pyrrolidinone, 40 wt. percent isopentyl methacrylate and 56 wt. percent myristyl methacrylate of a molecular weight of about 1,000,000. These copolymers are further described in U.S. 3,131,119.

The condensation product ashless dispersant of $C_{50}$ to $C_{200}$ alkenyl succinic anhydride and trialkoxylated N-aminoalkyl piperazine of a 2000 to 5000 molecular weight contemplated herein are obtained by reacting under substantially anhydrous conditions $C_{50}$ to $C_{200}$ alkenyl succinic anhydride with a trialkoxylated N-$C_1$ to $C_5$ aminoalkyl piperazine in a ratio of acyl groups to hydroxyl groups of between about 1:1 and 1:2 at a temperature between about 80 and 220° C. while continuously removing water. Specific examples of product are the condensation product of N-aminoethyl piperazine and polybutene (1100 M.W.) succinic anhydride wherein acyl to hydroxyl ratio is 1:1.5; the condensation product of tributoxylated N-aminopropyl piperazine and polypropylene (3000 M.W.) succinic anhydride wherein the acyl to hydroxyl group ratio is 1:1; the condensation product of triethoxylated N-aminopentyl piperazine and polyethylene (1000 M.W.) succinic anhydride wherein the acyl to hydroxyl group ratio is 1:2.

When the composition of the invention is to function as a carrier for an oil insoluble pesticidal composition, the solid pesticidal materials used therein normally are of a particle size less than 200 mesh (U.S. Standard). Specific examples of suitable pesticidal materials are copper hydroxide, copper oxide, tribasic copper sulfate, copper arsenite, copper oxychloride sulfate, calcium arsenate, lead arsenate, sodium fluoride, sulfur, mixtures thereof as well as organic compounds such as manganese ethylene bis-(dithiocarbamate), 1-naphthyl-N-methyl-carbamate (marketed by Union Carbide Corp. under the trade name Sevin), 3[2-(3-5-dimethyl-2-oxychlorohexyl)-2-hydroxyethyl]glutaramide, sodium, zinc- and iron alkyl dithiocarbamates, tetramethyl thiuram disulfide and N-trichloromethylmercapto-4-cyclohexane-1,2-dicarboximide and mixtures thereof as well as mixtures of inorganic and organic compounds. The oil insoluble pesticide material is generally present in the agricultural composition in an amount between about 30 and 60 wt. percent. The particular percentage depends on the pesticide employed, the particular agricultural conditions to be encountered and the pests to be eliminated.

The foregoing quantities and particle size are also applicable when the composition of the invention is to be employed as a carrier for an oil insoluble metal working additive such as calcium carbonate in the concentrate form.

In respect to the base oil compositions of the invention, one of my discoveries is the ashless dispersant therein not only functions as an oil insoluble particle dispersant but unexpectedly also functions to substantially reduce the composition viscosity to a point which will render it suitable in agricultural and metal working uses. Further, if the salt component is used in sedimentation resistant quantities alone or in combination with insufficient quantities of the ashless dispersant, the viscosity (kinematic) of the resultant composition becomes so large, e.g., 5000–100,000 cs. or more at 77° F. as to render it unsuitable in agricultural and metal working formulations. Another unexpected finding is the particular combination of sedimentation resistant salt and ashless detergent as defined in the composition of the invention is critical in producing a base oil product which will retain its fluidity and sedimentation resistant qualities after incorporation of oil insoluble pesticidal or metal working additives therein. Employment of ashless dispersant and sedimentation resistant salt combination outside the scope of invention appears to result in an agricultural or metal working composition of insufficient fluidity and/or insufficient resistance to sedimentation. In other words, the particular combination of ingredients and quantities in the compositions of the invention are material in rendering said compositions fluid enough to permit its ready application or dispersment when oil insoluble pesticides or inorganic additives for metal working are incorporated therein while at the same time providing good resistance to sedimentation on storage.

The following examples further illustrate the composition of the invention but are not to be construed as limitations thereof.

EXAMPLE I

To a 500 gallon stainless steel reactor fitted with a flat blade turbine type impeller and recycle centrifugal pump system, there was charged 450 lbs. (Oil A) of a residuum of a product resulting from sulfuric acid alkylation of isobutane with isobutene having an initial boiling point of about 318° F., an end boiling point of about 512° F., a 50% boiling point of about 362° F., a kinematic viscosity at 100° F. of about 1.5 cs. and an unsulfonatable content of 95 wt. percent, 13 lbs. of aluminum tri-(ethyloleyl-o-phosphate) designated as ALEOP and 43 lbs. of ethoxylated derivative of inorganic phosphorus acid-free, steam-hydrolyzed polyisobutene (1100 M.W.)-$P_2S_5$ reaction product (ethoxylated hydrolyzed HC-$P_2S_5$) having a phosphorus content of 1.0 wt. percent, a sulfur content of 0.7 wt. percent, and mole ratio of ethylene oxide to reaction product in said derivative of about 1:1. The impeller and centrifuge pump were activated for stirring, and the reactor contents were heated to a temperature of about 300° F. Stirring was continued until solutioning occurred. There was then charged with continued stirring and heating 1450 lbs. paraffinic lubricating oil (Oil B) having a kinematic viscosity at 100° F. of 17 cs., an initial boiling point of about 623° F., an end boiling point of about 775° F., and an unsulfonatable residue of 92.8 wt. percent and stirring was continued for a period of ½ hour. The final blend had the following composition set forth in Table I below:

TABLE I

| Ingredients: | Wt., percent |
| --- | --- |
| Oil A | 49.05 |
| Oil B | 49.05 |
| ALEOP | 0.45 |
| Visc., kin. at 100° F., cs.: 14 | |
| Ethoxylated hydrolyzed HC-$P_2S_5$ | 1.45 |

EXAMPLE II

To a one liter 3-necked flask equipped with stirrer and condenser there was charged 98 grams of aforedescribed Oil A (Ex. I) and 6 grams ethylene oxide derivative of inorganic phosphorus acid-free, steam-hydrolyzed polybutene (1100 M.W.)-$P_2S_5$ reaction product (Ex. I), 1 gram ALEOP and 98 grams Oil B (Ex. I). Stirring was initiated and continued at 200 r.p.m. for a 3 hour period during which time the stirred mixture was heated to and maintained at 300° F. The composition of the resulting blend was the same as for Example I except that the "ethoxylated hydrolyzed HC-$P_2S_5$" (Ex. I) content was 1.8 wt. percent and the kinematic viscosity of the resultant product at 100° F. was 15 cs.

EXAMPLE III

"Ethoxylated hydrolyzed HC-$P_2S_5$" defined in Example I in an amount of 70.6 grams was dissolved in 100 grams Oil A (Ex. I) and 29.4 grams ALEOP were added. The reactants were heated to 120° C. in a stirred 3-necked flask for 5 hours. The viscous concentrate, containing 50 wt. percent Oil A, 35.3 wt. percent ethoxylated hydrolyzed HC-$P_2S_5$ product and 14.7 wt. percent ALEOP was filtered through a fine screen. When 10 grams of the concentrate was blended at ambient temperature with 142 grams Oil A and 142 grams Oil B (Ex. I), the resulting blend contained 0.5% ALEOP and 1.2% ethoxylated hydrolyzed HC-$P_2S_5$ derivative in an approximately 50/50 wt. percent blend of Oil A and Oil B. It was thus similar in composition to the base oil composition of Example I and had a kinematic viscosity at 100° F. of 15.1 cs.

Additional runs were conducted substituting for ALEOP aluminum tri-(ethyllauryl orthophosphate) designated as ALELP, aluminum octanoate, ferric tri-(ethyloleyl orthophosphate) designated as FeEOP, calcium di-(ethyloleyl orthophosphate) designated as CaEOP, sodium ethyloleyl orthophosphate designated as NaEOP, nickel dioctanoate, n-butylammonium ethyloleyl orthophosphate and a mixture of t-$C_{12}H_{25}NH_3^+$, t-$C_{13}H_{27}NH_2^+$, t-$C_{14}H_{29}NH_3^+$, t-$C_{15}H_{31}NH_2^+$ ethyloleyl orthophosphates designated as Primene 81R–EOP. Still further (1) a condensation product of polybutene (1100 M.W.) succinic anhydride a tripropoxylated N-aminoethyl piperazine in which the mole ratio of the anhydride to triol is 3:2 designated as "Succinic-Piperazine Prod.," (2) a propoxylated derivative inorganic acid free, steam hydrolyzed polybutene(1100 M.W.)-$P_2S_5$ reaction product wherein the mole ratio of propylene oxide to said reaction product in said derivative is about 1:1 designated as "Propox HC-$P_2S_5$" and (3) the copolymer of a molecular weight of about 550,000, said copolymer formed from about 8 wt. percent N-vinyl-2-pyrrolidinone, 30 wt. percent stearyl methacrylate, 50 wt. percent lauryl methacrylate and 12 wt. percent butyl methacrylate designated as "Acrylic Polymer" was substituted for the ethoxylated, hydrolyzed polybutene-$P_2S_5$ derivative.

For comparative purposes base oil compositions were formulated outside the scope of the invention wherein aluminum trioleate, aluminum tristearate, aluminum tripalmitate, ammonium ethyloleyl orthophosphate ($NH_4EOP$), and cupric naphthenate were employed as the sediment resisting salts. Further, also for comparative purposes the following ashless dispersant outside the scope of the invention were employed: (1) lecithin, (2) polybutene(1100 M.W.) succinamic acid of tetraethylenepentamine prepared from the equivalent reaction of polybutene(1100 M.W.) succinamic anhydride and tetraethylenepentamine (Pentamine Prod.), and (3) a trimethylolpropane esterified derivative of inorganic acid free, steam hydrolyzed polybutene(1100 M.W.)-$P_2S_5$ reaction product designated as "TMP Ester HC-$P_2S_5$."

In the subsequent tables the test base oil compositions are described as well as reference to the examples which describe the particular blending procedure by which each test composition is formed. Also shown in the tables are the sediment resistant and fluidity characteristics of the base oil compositions of the invention. This is demonstrated by the preparation of dispersions formulated by stirring 100 grams of each of the base oil compositions and 100 grams Sevin insecticide (1-naphthyl-N-methylcarbamate). The stirring was conducted at about 10,000 r.p.m. in a blender. The viscosities were measured with a Brookfield RVF Viscometer using the No. 2 spindle at 20 r.p.m. except where a smaller spindle or a slower speed were required because of a viscosity above 2000 cps. (centipoise). The storage tests were run by allowing a 200 gram sample of the Sevin containing dispersion to stand in a stoppered 8 oz. bottle at room temperature with periodic probing to detect the formation of any dense, pasty sediment which would be difficult to redisperse.

The viscosity of the Sevin containing dispersions is related to their sprayability. Although no clear-cut upper limit can be stated unequivocally, because of the wide variability in spraying equipment and conditions, a value much in excess of 2000 cps. at 77° F. may cause difficulties.

Tables IIA and IIB below represent the base oil compositions of the invention and their resultant Sevin dispersions. Tables IIC and IID represent comparative compositions. A comparison of the viscosity and storage stability results of Tables IIA and IIB with Tables IIC and IID demonstrates the materiality of the particular ingredient combination of the invention as defined. The tables are as follows:

TABLE IIA

| Run No. | 1 | 2 | 3 | 4 | 5 | 6 |
|---|---|---|---|---|---|---|
| Blendipg procedure for base oil—Ex. | II | II | II | III | III | III |
| Base oil comp. (wt. percent): | | | | | | |
| Oil A | 49.15 | 48.2 | 49.35 | 49.15 | 49.25 | 49.0 |
| Oil B | 49.15 | 48.2 | 49.35 | 49.15 | 49.25 | 49.0 |
| ALEOP | 0.5 | 0.5 | | 0.5 | | |
| Al octanoate | | | 0.5 | | 0.5 | |
| ALELP | | | | | | 0.5 |
| Succinic-piperazine prod | | | 0.8 | | | |
| Propox. HC-$P_2S_5$ | | 3.1 | | | | |
| Ethox. HC-$P_2S_5$ | | | | 1.2 | 1.0 | 1.5 |
| Acrylic polymer | 1.2 | | | | | |
| 50 wt. percent base oil–50 wt. percent Sevin disp.: Visc. at 77° F. (Brookfield) cps. | 2,000 | 400 | 480 | 460 | 560 | 1,360 |
| Ambient storage properties of dispersion: Days to form dense sediment * | 123+ | 184+ | 154+ | 138+ | 145+ | 113 |

* "+" Denotes no dense sediment formed during the number of days signified.

TABLE IIB

| Run No. | 7 | 8 | 9 | 10 | 11 | 12 |
|---|---|---|---|---|---|---|
| Blending procedure for base oil—Ex. | III | III | III | II | II | II |
| Composition (wt. percent): | | | | | | |
| Oil A | 49.15 | 49.15 | 49.57 | 49.25 | 49.35 | 49.6 |
| Oil B | 49.15 | 49.15 | 49.58 | 49.25 | 49.35 | 49.6 |
| Ethox. HC-$P_2S_5$ | 1.2 | 1.2 | 0.6 | 0.5 | 0.7 | 0.3 |
| FeEOP | 0.5 | | | | | |
| CaEOP | | 0.5 | | | | |
| NaEOP | | | 0.25 | | | |
| Ni octanoate | | | | 0.6 | | |
| n-Butyl ammonium EOP | | | | | 0.6 | |
| Primene 81R *—EOP | | | | | | 0.5 |
| 50 wt. percent base oil–50 wt. percent Sevin disp.: Visc. at 77° F. (Brookfield) cps. | 900 | 280 | 160 | 300 | 130 | 920 |
| Ambient storage properties: Days to form dense sediment | 80+ | 80+ | 40+ | 40+ | 40+ | 40+ |

* Primene 81R is a trade name product of Rohm & Haas Co. representing a mixture of t-$C_{12}H_{25}NH_2$, t-$C_{13}H_{27}NH_2$, t-$C_{14}H_{29}NH_2$ and t-$C_{15}H_{31}NH_2$.

TABLE IIC

| Run No. | 13 | 14 | 15 | 16 | 17 |
|---|---|---|---|---|---|
| Blending Procedure Example | II | II | II | II | III |
| Composition (wt. percent): | | | | | |
| Oil A | 49.75 | 49.4 | | | 49.37 |
| Oil B | 49.75 | 49.4 | 99.25 | 99.375 | 49.38 |
| ALEOP | 0.5 | | | | |
| Al oleate | | | 0.25 | | |
| Al palmitate | | | | 0.125 | |
| Al stearate | | | | | 0.5 |
| Ethos. HC-$P_2S_5$ | | 1.2 | 0.50 | 0.5 | 0.75 |
| 50 wt. percent base oil–50 wt. percent Sevin disp.: Visc. (Brookfield) at 77° F., cps. | [1] 120,000 | 40 | ([2]) | Viscous | 130 |
| Ambient storage properties of base composition: Days to form dense sediment | 41+ | 1 | 1 | 6 | 4 |

[1] Flows very slowly. [2] Very fluid.

TABLE IID

| Run No. | 18 | 19 | 20 | 21 | 22 |
|---|---|---|---|---|---|
| Blending procedure example | II | III | II | II | II |
| Composition (wt. percent): | | | | | |
| Oil A | | 49.37 | 49.55 | 49.15 | 48.75 |
| Oil B | 97.75 | 49.38 | 49.55 | 49.15 | 48.75 |
| ALEOP | | 0.50 | | | 0.50 |
| Al stearate | 1.25 | | | | |
| Cu naphthenate | | | 0.8 | | |
| $NH_4EOP$ | | | | 0.5 | |
| Lecithin | 1.0 | | | | |
| Pentamine prod | | 0.75 | | | |
| Ethox. HC-$P_2S_5$ | | | 0.1 | 1.2 | |
| TMP Ester HC-$P_2S_5$ | | | | | 2 |
| 50 wt. percent base oil–50 wt. percent Sevin disp.: Visc. (Brookfield) at 77° F., cps. | Viscous | 520 | Solid | 110 | |
| Ambient storage properties of base composition: Days to form dense sediment | 30 | 10 | 23 | 20 | 13 |

EXAMPLE IV

This example illustrates the outstanding ability of the compositions of the invention when employed in metal working compositions to function as an effective agent in maintaining the oil insoluble inorganic ingredient in suspension and yet remain in a very fluid state.

Illustrative composition BB (Table III) employing the base oil composition of the invention is useful as a drawing compound to prevent adhesion of metal dies to metallic objects being formed by cold drawing. Oil A, Oil B, ALEOP, Ethoxylated HC-$P_2S_5$ have been previously described in Example I. The storage test is described in Example III. The test data and results are reported below in Table III:

TABLE III

| Ingredients, wt. % | Composition | |
|---|---|---|
| | AA | BB |
| Oil A | 32.5 | 24.15 |
| Oil B | 32.5 | 24.15 |
| ALEOP | | 0.5 |
| Ethoxylated HC-$P_2S_5$ | | 1.2 |
| Precipitated $CaCO_3$ [1] | 35 | 50.0 |
| Tests: Visc. (Brookfield) at 77° F. cps | 50,000 | 58 |
| Storage test: Days for appearance of dense sediment | 33+ | 33 |

[1] Average particle size of 0.04-0.05 micron.

As can be seen from the above using the base oil combination of this invention, it was possible to prepare a readily sprayable composition containing 50% by weight of $CaCO_3$, the active ingredient in preventing pick-up of metal by the die. In comparative composition AA, only 35 wt. percent $CaCO_3$ gave a composition having an excessive high viscosity. In spite of its very low viscosity, composition BB stood for 33 days before the appearance of dense sediment.

As can be seen from the foregoing, in order for the base oil composition to function as an outstanding suspending agent for inorganic compounds in metal working formulations, it is necessary for the combination of the oil, ashless dispersant and sediment resisting salt to be as defined.

EXAMPLE V

The previously mentioned desirability of using oils with a high unsulfonatable residue, from the standpoint of the viscosity of dispersions made therefrom, is illustrated by the subsequent Table IV. ALEOP, ethoxylated HC-$P_2S_5$ and Sevin have been heretofore defined in Examples I and III. The test data and results are reported below in Table IV:

TABLE IV

| Ingredients | Composition | |
|---|---|---|
| | CC | DD |
| Oil B [1] | 48.0 | |
| Oil C [2] | | 48.0 |
| ALEOP | 0.5 | 0.5 |
| Ethoxylated HC-$P_2S_5$ | 1.5 | 1.5 |
| Sevin | 50.0 | 50.0 |
| Tests: Visc. (Brookfield) at 77° F., cps | 8,400 | ([3]) |

[1] Paraffinic oil having an unsulfonatable residue of 96.6 wt. percent, a vis. (kin.) at 100° F.=15 cs.
[2] Naphthenic oil. Unsulfonatable residue—75 wt. percent; Vis (kin.) at 100° F.=14 cs.
[3] Above 20,000.

Although the two oils from which these dispersions were made had essentially the same viscosity at 100° F., they differed significantly in their unsulfonatable residues. It will be noted that Oil B representative of the oils of this invention gave a much lower viscosity dispersion than comparative Oil C.

I claim:

1. An oleiferous composition consisting essentially of a paraffinic hydrocarbon oil having a kinematic viscosity at 100° F. between about 1.5 and 70 cs. and an unsulfonatable content of at least 90 wt. percent containing between about 0.1 to 2 wt. percent of an oil soluble, sediment resisting salt and between about 0.1 and 5 wt. percent of an oil soluble ashless dispersant, said salt of the formula $M(Z)_y$ where M is a first member selected from the group consisting of an ion of aluminum, nickel, iron, alkali metal, alkaline earth metal, and alkylammonium of from 3 to 20 carbons, y is an integer representing the valence of said first member, Z is a monovalent radical selected from the group consisting of:

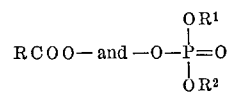

where R is alkyl of from 5 to 12 carbons, $R^1$ is alkyl of from 1 to 3 carbons and $R^2$ is a second member selected from the group consisting of alkyl and alkenyl of from 10 to 22 carbons, said dispersant selected from the group consisting of:
  (a) an alkoxylated derivative of an inorganic phosphorus acid free, steam hydrolyzer, polyalkene (250–50,000 M.W.)-$P_2S_5$ reaction product wherein the alkoxy group contains from 2 to 10 carbons;
  (b) a copolymer of N-vinyl-2-pyrrolidinone and alkyl methacrylate of a molecular weight between about 100,000 to 2,000,000 consisting of between about 4 and 15 wt. percent N-vinyl-2-pyrrolidinone and between 85 and 96 wt. percent of alkyl methacrylate, said alkyl containing from 4 to 18 carbons;
  (c) and a condensation product of trialkoxylated N-aminoalkyl piperazine and alkenyl succinic anhydride of a molecular weight between about 2000 and 5000 wherein said alkoxy is of from 2 to 10 carbons, said alkyl is from 1 to 5 carbons and said alkenyl is of from 50 to 200 carbons derived from an alkene of from 2 to 10 carbons.

2. A composition in accordance with claim 1 wherein said salt is aluminum tri-(ethyloleyl orthophosphate).

3. A composition in accordance with claim 2 wherein said dispersant is the ethoxylated derivative of inorganic phosphorus acid free, steam hydrolyzed polybutene (1100 M.W.)-$P_2S_5$ reaction product wherein the mole ratio of ethylene oxide to reaction product in said derivative is between about 1:1.

4. A composition in accordance with claim 2 wherein said dispersant is the propoxylated derivative of inorganic acid free, steam hydrolyzed polybutene(1100 M.W.)-$P_2S_5$ reaction product wherein the mole ratio of propylene oxide to reaction product in said derivative is about 1:1.

5. A composition in accordance with claim 2 wherein said ashless dispersant is the condensation product of polybutene(1100 M.W.) succinic anhydride and tripropoxylated 2-aminoethyl piperazine wherein the acyl and hydroxyl groups are present in said condensation product in a ratio of about 1:1.

6. A composition in accordance with claim 1 wherein said dispersant is the ethoxylated derivative of inorganic phosphorus acid free, steam hydrolyzed polybutene(1100 M.W.)-$P_2S_5$ reaction product wherein the mole ratio of ethylene oxide group to reaction product group in said derivative is about 1:1.

7. A composition in accordance with claim 6 wherein said salt is aluminum tri-octanoate.

8. A composition in accordance with claim 6 wherein said salt is ferric tri-ethyloleyl orthophosphate).

9. A composition in accordance with claim 6 wherein said salt is sodium ethyloleyl orthophosphate.

10. A composition in accordance with claim 6 wherein said salt is nickel di-octanoate.

11. A composition in accordance with claim 6 wherein said salt is calcium di-(ethyloleyl orthophosphate).

12. A composition in accordance with claim 6 wherein said salt is n-butylammonium ethyloleyl orthophosphate.

13. A composition in accordance with claim 6 wherein said salt is a mixture of $t\text{-}C_{12}H_{25}NH_3^+$, $t\text{-}C_{13}H_{27}NH_3^+$, t-$C_{14}H_{29}NH_3^+$ and t-$C_{15}H_{31}NH_3^+$ ethyloleyl orthophosphates.

References Cited
UNITED STATES PATENTS

| | | | |
|---|---|---|---|
| 2,512,359 | 6/1950 | McGrogan | 252—32.5 |
| 2,773,032 | 12/1956 | Cantrell et al. | 252—32.5 |
| 2,776,924 | 1/1957 | Martin | 424—80 |
| 2,853,416 | 9/1958 | Kellog | 424—80 |
| 2,964,447 | 12/1960 | Hosmer | 424—80 |
| 3,017,361 | 1/1962 | Morris et al. | 252—32.7 |
| 3,087,956 | 4/1963 | Lacoste et al. | 252—51.5 |
| 3,131,119 | 4/1964 | Fordyce et al. | 252—51.5 |
| 3,171,779 | 3/1965 | McCoy et al. | 424—81 |
| 3,233,442 | 2/1966 | Zvanut | 252—32.5 |
| 3,428,563 | 2/1969 | Lowe | 252—32.7 |

DANIEL E. WYMAN, Primary Examiner

I. VAUGHN, Assistant Examiner

U.S. Cl. X.R.

72—42; 252—18, 34.7, 37.2, 40.7, 42.1, 49.8, 51.5; 424—78, 81, 224, 295, 358